United States Patent [19]

Jacaruso

[11] Patent Number: 4,680,216
[45] Date of Patent: Jul. 14, 1987

[54] METHOD FOR STABILIZING THICK HONEYCOMB CORE COMPOSITE ARTICLES

[75] Inventor: Gary J. Jacaruso, Milford, Conn.

[73] Assignee: United Technologies Corporation, Hartford, Conn.

[21] Appl. No.: 647,308

[22] Filed: Sep. 4, 1984

[51] Int. Cl.⁴ .............................................. B32B 3/12
[52] U.S. Cl. ................................................ 428/116
[58] Field of Search ...................................... 428/116

[56] References Cited

U.S. PATENT DOCUMENTS

| Re. 31,355 | 8/1983 | Rozmus | 419/49 |
| 4,291,079 | 9/1981 | Hom | 428/116 |
| 4,344,995 | 8/1982 | Hammer | 428/116 X |
| 4,350,551 | 9/1982 | Michaelson | 428/116 X |

Primary Examiner—Peter A. Nelson
Attorney, Agent, or Firm—Alan C. Cohen

[57] ABSTRACT

A method of stabilizing thick honeycomb core composites is disclosed. The method comprises bonding a layer of resin impregnated woven grahite fibers to one surface of the honeycomb core, then curing the resin impregnates forming a stabilized honeycomb core. This stabilized core is then cut to net shape and the composite structure is formed by laying one or more resin impregnated fiber layers onto the stabilized core surfaces and curing the lay-up under heat and pressure forming the composite article. Also disclosed is a stabilized honeycomb subassembly formed by bonding a graphite fiber, resin impregnated layer onto one of the honeycomb core surfaces and curing the resins, then shaping the stabilized honeycomb core to the desired form.

2 Claims, 4 Drawing Figures

METHOD FOR STABILIZING THICK HONEYCOMB CORE COMPOSITE ARTICLES

The Government has rights in this invention pursuant to Contract No. N00019-82-C-0127 awarded by the Department of the Navy.

TECHNICAL FIELD

The field of art to which this invention pertains is a method of formation of fiber reinforced composite articles having a core of porous cellular material. It is particularly useful for fiber reinforced composite sandwich articles having honeycomb centers.

BACKGROUND ART

The use of honeycomb core structures to act as lightweight structural members in fiber reinforced composite articles is well known. These structures comprise a honeycomb core of aluminum, phenolic or Nomex ® or other open cellular material sandwiched between layers of fiber reinforced resin matrix materials. These structures are laid up with the resin matrix in the uncured or B-stage state, which must be heated, typically under vacuum and pressure, to cure the resin and form the finished composite article.

Presently, these composites use honeycomb cores which are about one inch or less in thickness. The pressure and vacuum required in curing such composite articles creates minimum problems with reference to the cores of this size. However, recently it has become desirable to utilize honeycomb cores with thicknesses greater than one inch. Unfortunately, the use of honeycomb cores of this thickness have created problems during the curing cycle when the composite part is placed under the required vacuum and pressure. It has been determined that the pressure, which may be as high as 50 psi or more, applied to these structures causes the sides of the honeycomb core to collapse and in collapsing it becomes dimensionally distorted. This may be seen clearly in FIGS. 1 and 2 wherein FIG. 1 is the prepreg lay-up composite 1 prior to being cured, using unstabilized honeycomb core 10 with graphite fiber layers 20 on the top and bottom of the honeycomb 10. FIG. 1 shows the cured composite showing the distortion resulting from the curing process. This distortion is typically known as "lemon seeding"; wherein the sides 30 of the structure are caused to collapse under the curing conditions.

A number of approaches have been taken to attempt to stabilize the honeycomb and prevent it from collapsing during the curing process. One such approach was to fill the outermost portions of the honeycomb with a rigid adhesive such as Epocast ™ epoxy adhesive, but this did not work as it also crushed the honeycomb when the lay-up was cured and additionally added weight to the structure. An alternate approach was to apply a layer of several different materials to see which material, if any, would result in a stabilized article. A few of the materials which were tried were metal bond, fiber glass, and Kevlar ® fibers. However, none of these resulted in a satisfactory solution as the honeycomb continued to collapse. Additionally, a number of the materials which were tried, would not have been desirable from the point of view that they were parasitic, and were not necessarily used in the construction of the particular composite article, and added undesirable material cost and weight to the article.

Therefore, what is required in this art is a simple, inexpensive method for stabilizing the thick honeycomb cores during this curing process.

DISCLOSURE OF INVENTION

The present invention discloses a method of stabilizing honeycomb core structures such that upon final curing of the composite lay-up, no substantial "lemon seeding" occurs resulting in a net shaped cured composite.

The method comprises bonding a layer of resin impregnated, continuous woven graphite fibers to a core of open cellular honeycomb; curing the resin to form the stabilized honeycomb core; then shaping the stabilized core to net shape and then forming the desired composite article by applying the desired layers of additional composite material onto the core; and curing to form the final composite article.

Also disclosed is a stabilized honeycomb core comprising an open cellular honeycomb core having bonded to it a layer of resin impregnated continuous woven graphite fibers.

Other features and advantages will be apparent from the specification and claims and from the accompanying drawings which illustrate an embodiment of the invention.

BEST MODE OF CARRYING OUT THE INVENTION

Figure 1:
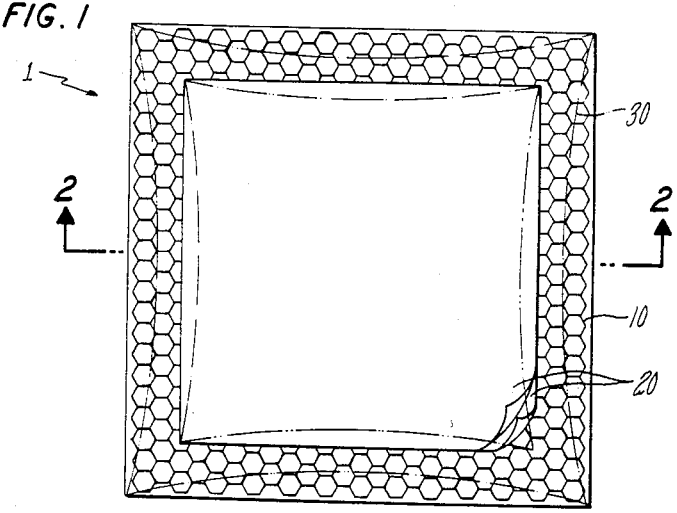
FIG. 1 is a view of a honeycomb core composite lay-up prior to and after the curing of the resin matrix.
Figure 2:
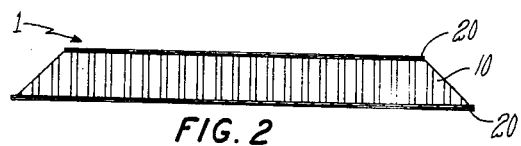
FIG. 2 depicts a side view of a honeycomb core composite lay-up prior to the curing of the resin matrix.

A honeycomb core to be stabilized may be any of the conventionally used open cellular honeycombs useful in the manufacture of fiber reinforced honeycomb core composite structures. Generally, the honeycomb core may be formed of aluminum, Nomex ®, phenolic etc. or any one of the materials from which honeycomb structures are conventionally made. Typically the walls of the honeycomb cells will range from about 0.002 inch to about, 0.008 inch in thickness. The preferred honeycomb material is a Nomex ® or phenolic type. It should be noted that this method will find its greatest usefulness with honeycomb structures which are greater than one inch in height. (This height being the direction of the open cell walls.)

The graphite fiber layer which may be used to stabilize the honeycomb core during the curing cycle may be any of the conventional graphite fibers. The fiber orientation should be such that the greatest compressive strength of the fibers is oriented in the direction of the greatest compressive forces being applied to the honeycomb core. A typical example of this would be in a honeycomb core which is either square or rectangular in shape in which the compressive forces are primarily directed at the four sides. Under these circumstances the graphite fibers should be woven at ±90° to each other and the layer should be attached to the honeycomb core, such that the fibers are at ±90° to the sides of the honeycomb walls. In a circular honeycomb structure, it would be desirable to have the graphite fibers oriented in as close to an isotropic condition as possible. Typically, the compressive strength of these polymer reinforced, graphite woven fibers ranges from about 100,000 psi to about 150,000 psi after curing. In general, these woven layers are about 0.005 mils to about 0.014 mils in thickness with a preferred thickness of about 0.014 mils.

Although the invention is described using woven graphite cloth, it may be possible to use two or more plies of unidirectional graphite fibers laid at appropriate angles to one another to form a reinforcing system which would present the desired compressive strength features to form the stabilized honeycomb.

The graphite fiber layer is impregnated with a resin. Typically, the resin used to impregnate the graphite is the same as that which will be used throughout the rest of the composite structure but it need not be so limited. Typically, these resin systems are thermosetting materials (i.e. an epoxy) however, thermoplastic resin may also be used if they will retain sufficient rigidity during the curing process of the final net shape composite article. These resin systems are conventional and would be known to one skilled in this art. The amount of resin impregnated into the graphite will typically range from about 40 percent to about 60 percent by volume. However, the amount is not that critical so long as the cured resin/graphite layer is capable of maintaining the graphite layers compressive strength during the final curing of the composite.

In addition to conventional resin systems, an adhesive prepreg system which contains an adhesive material or a resin that may act as an adhesive and bond the graphite to the honeycomb, may also be used. This would eliminate the necessity for separate bonding layers to aid in attaching the grahite to the honeycomb as described below.

The honeycomb core is first cut to particular desired dimensions. A layer of graphite fiber is attached to the open cell surface of the honeycomb which has the largest surface area (although if reduced efficiency can be tolerated, the smaller surface may be used). The nature of the attachment must be one which creates an intimate contact between the graphite layer and the honeycomb core. This is typically achieved by applying a thin layer of film adhesive to the honeycomb surface prior to the application of the graphite ply. Most any compatible film adhesive may be used such as Metalbond ® 1113, AF 163, and FM 1000 epoxy resin based adhesive, however, Metalbond ® 1113 which is available from Narmco Corporation is the preferred material. The film adhesive layer is generally about 0.003 inch to about 0.008 inch thick with about, 0.003 inch thick being preferred. Although the adhesive thickness is not that critical, too thin a layer will result in the graphite layer breaking away from the core, and too thick a layer will allow the graphite layer to shift in relation to the core due to the adhesive layers lower compressive strength. As mentioned above, an alternative method would be to use an adhesive prepreg material as the impregnate for the graphite cloth, thereby avoiding the application of a separate adhesive layer. After the graphite layer has been applied, the adhesive is cured using conventional vacuum bagging techniques and proper pressure forming the stabilized honeycomb. Typically, the curing process will include placing the vacuum bagged article in an autoclave and under temperatures of about 350° F. and a pressure of up to about 50 psi. The adhesive is cured by bonding the graphite to the honeycomb.

Figure 3:
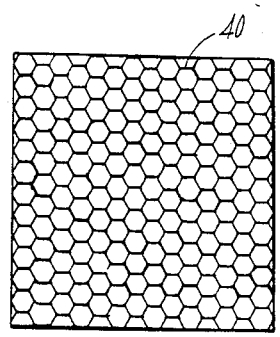
FIG. 3 shows the honeycomb panel with a layer of stabilizing graphite material after curing of the resin matrix.

As a result of the stabilization process, the honeycomb will have collapsed or "lemon seeded" to a certain extent (about 20 percent to 100 percent depending on the height of the honeycomb core). The stabilized core is then cut to the desired net shape by removing (cutting off) the collapsed portion, thus forming the stabilized structure of FIG. 3, having an open honeycomb top 40 and a graphite stabilizing layer (not shown) on the bottom.

The net shaped stabilized honeycomb is then formed into a final composite structure by the conventional techniques such as placing a number of layers of preimpregnated fiber layers on the top and the bottom of the stabilized honeycomb core, forming the lay-up. Placing this lay-up into a form, enclosing the lay-up in a bag and under vacuum, pressure and temperature curing the resin and thus forming the composite article. All of the parameters associated with the curing process of these composites are conventional and will be known to one skilled in the art. Typically the pressures applied to cure these structures is up to about 50 psi with temperatures about 350° F.

Figure 4:
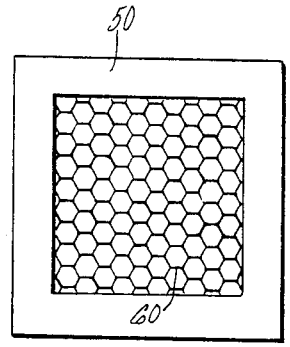
FIG. 4 shows an alernative approach to stabilizing the honeycomb by placing a ring of graphite about the periphery of the honeycomb.

An alternative to covering an entire surface of the honeycomb may be to apply a ring of graphite fibers about the rim of the surface to be stabilized as shown in FIG. 4. Wherein the graphite fiber layer 50 is only laid up about the edge of the honeycomb surface 60, thereby stabilizing the edges with sufficient compressive strength to prevent collapse.

EXAMPLE

A honeycomb core composite article was formed using the present invention as follows. A piece of Nomex ® honeycomb core was cut to the following dimensions, 2 inches high by 6 feet long by 6 feet wide. This material is available from the Hexcell Corporation. This sheet was then placed on a mold and a layer of Metalbond ® 1113 filler adhesive, available from Narmco Corporation, was then applied to one surface of the honeycomb core. The thickness of this film adhesive was, 0.003 inch. Over the layer of film adhesive was applied a layer of 0.014 inch thick Narmco 5225 with a 285 weave graphite fiber cloth. The graphite layer was 0.014 inches in thickness and was cured to the bottom of the core at 350° F. 50 psi for 2 hours.

After the graphite layer had been adhered to the honeycomb, a layer of the same film adhesive was applied to both surfaces of the honeycomb. Four plys of 5225 graphite epoxy prepreg from Narmco Corporation were then laid up over each layer of film adhesive forming the lay-up. The lay-up was then placed in a vacuum bag and the bag and lay-up were then placed in an autoclave wherein the bag was evacuated and cured under 50 psi of pressure and 350° F. for 2 hours. The resulting composite article showed no crushing of the honeycomb.

Although not verified through testing, the resulting structure would also have a lower knockdown factor (reduced laminate properties, i.e. tension and compressive strengths wherein these properties may be reduced by as much as 70 percent) in the outer skin which is normally the primary load path in sandwich structures. This is due to the stabilized layer of graphite which forms a membrane which applies pressure in between cells, thereby minimizing the knockdown effect.

It should be understood that the invention is not limited to the particular embodiments shown and described herein, but that various changes and modifications may be made without departing from the spirit and scope of this novel concept as defined by the following claims.

I claim:

1. A method of making a fiber reinforced composite article having a honeycomb core wherein the honeycomb core has a thickness greater than one inch, comprising:

bonding a layer of resin impregnated, woven, continuous graphite fibers to one of the open-cell surfaces of the honeycomb core, curing the resin thereby stabilizing the honeycomb core, cutting the stabilized honeycomb core to net shape, laying up one or more layers of reinforced matrix material onto the shaped, stabilized honeycomb, heating under vacuum and pressure to cure the resin matrix resulting in a honeycomb core containing composite with the honeycomb core having substantially retained its pre-bonded shape.

2. A structurally stable, open-cell, honeycomb core structure having a wall height greater than 1.0 inch comprising an open-cell honeycomb core having a layer of cured, resin impregnated, graphite fibers bonded to one open-cell surface of the honeycomb core, the walls of the bonded core being substantially noncompressible under heat and pressure or vacuum.

* * * * *